United States Patent [19]

Tokunaga et al.

[11] 4,079,175

[45] Mar. 14, 1978

[54] METHOD FOR THE POLYMERIZATION OR COPOLYMERIZATION OF α-OLEFIN

[75] Inventors: Shoichi Tokunaga, Sinnanyo; Atsumi Kato, Hikari; Teruhiro Setoguchi; Shoji Mizuno, both of Shinnanyo, all of Japan

[73] Assignee: Toyo Stauffer Chemical Co., Ltd., Tokyo, Japan

[21] Appl. No.: 718,936

[22] Filed: Aug. 30, 1976

Related U.S. Application Data

[63] Continuation-in-part of Ser. No. 541,271, Jan. 15, 1975, abandoned.

[30] Foreign Application Priority Data

| Mar. 6, 1974 | Japan | 49-26066 |
| May 15, 1974 | Japan | 49-54032 |
| May 16, 1974 | Japan | 49-54710 |

[51] Int. Cl.$^2$ .................... C08F 4/66; C08F 10/06
[52] U.S. Cl. .................. 526/153; 252/429 B; 252/429 C; 526/142; 526/144; 526/158; 526/348.6; 526/351; 526/906
[58] Field of Search .............. 252/429 A, 429 B; 526/142, 144, 158, 159, 153

[56] References Cited

U.S. PATENT DOCUMENTS

| 3,034,992 | 5/1962 | Tornquist et al. | 526/158 |
| 3,164,577 | 1/1965 | Liebman et al. | 526/158 |
| 3,461,083 | 8/1969 | Luciani et al. | 526/158 |
| 3,639,375 | 2/1972 | Staiger et al. | 526/139 |
| 3,701,763 | 10/1972 | Wada et al. | 526/158 |
| 3,850,899 | 11/1974 | Wada et al. | 526/158 |
| 3,897,407 | 7/1975 | Shirai et al. | 526/158 |

FOREIGN PATENT DOCUMENTS

| 2,130,314 | 12/1971 | Germany. |
| 981,375 | 1/1965 | United Kingdom. |

*Primary Examiner*—Edward J. Smith
*Attorney, Agent, or Firm*—Wenderoth, Lind & Ponack

[57] ABSTRACT

A method for the polymerization or copolymerization of α-olefin wherein α-olefin is polymerized or copolymerized in the presence of a catalyst essentially comprising a reformed titanium trichloride and an organoaluminum compound. The reformed titanium trichloride is prepared by simultaneously pulverizing an organoaluminum compound and a crystalline titanium trichloride compound, the latter comprising titanium trichloride and aluminum trichloride, treating the pulverized mixture with a solvent selected from aromatic hydrocarbons, aromatic hydrocarbon halides and organic ethers, separating the treated material from the solvent, and heating the separated material.

17 Claims, No Drawings

METHOD FOR THE POLYMERIZATION OR COPOLYMERIZATION OF α-OLEFIN

CROSS REFERENCE TO RELATED APPLICATION

This application is a continuation-in-part of our copending application Ser. No. 541,271 filed Jan. 15, 1975, now abandoned.

BACKGROUND OF THE INVENTION

This invention relates to a method for manufacturing a catalyst which, in the polymerization of α-olefin, makes it possible to obtain a highly stereospecific polymer with a high polymerization activity, and also relates to a method for polymerizing or copolymerizing α-olefin in the presence of the above stated catalyst.

DESCRIPTION OF THE PRIOR ART

A method for manufacturing a stereospecific polymer by bringing α-olefin into contact, either in the presence or in the absence of an inert solvent, with a catalyst system comprising a halide of a metal selected from the groups IV, V and VI of the periodic table and an organometal compound of a metal selected from the groups I, II and III of the periodic table has generally been known.

For example, titanium trichloride, which is selected from halides of the metals belonging to the groups IV, V and VI of the periodic table, and an organoaluminum compound which is selected from organometal compounds of the metals belonging to the groups I, II and III, are in use as catalyst for the polymerization of α-olefin such as propylene and have brought about good results.

The titanium trichloride manufacturing method is well known. Namely, a solid solution or a crystalline compound comprising aluminum trichloride and titanium trichloride, which is obtained from the reduction of titanium tetrachloride with metal aluminum in the presence of aluminum trichloride and which is approximately of a structure $3TiCl_3 \cdot AlCl_3$, is pulverized by means of various pulverizers. The titanium trichloride which is prepared through such processes is being advantageously used for industrial purposes.

However, the efficiency of using of such titanium trichloride as a catalyst is low. It is generally believed, for instance, that only several percent of the titanium trichloride employed as catalyst contributes as a catalyst to such polymerizing reactions.

For a higher efficiency, therefore, there have been attempted various methods such as broadening the specific surface area of titanium trichloride by pulverizing it into finer particles, and reforming titanium trichloride by pulverizing it together with various inorganic and/or organic compounds.

Such a simple method of physical pulverization into finer particles alone not only does not bring about any great improvement in the polymerization activity of titanium trichloride but also results in a degraded grain characteristic of the polymer product because of the formation fo fine polymer particles to a great extent when such a finely pulverized titanium trichloride is employed as a component of a catalyst in the polymerization of α-olefin.

The polymerization activity of titanium trichloride also can not be enhanced to a great extent when the polymerization of α-olefin is carried out using the titanium trichloride, which is reformed by pulverizing it together with various inorganic and/or organic compounds, as a component of a catalyst although the yield of a crystalline polymer product will be increased thereby.

Broadly stated, improvement in the polymerization activity of titanium trichloride brings about an adverse effect on the physical and chemical properties of the polymer products. In the polymerization or copolymerization of α-olefin, for example, the ratio of formation of stereospecific polymer decreases as the polymerization activity of titanium trichloride increases and this inevitably results in the formation of a considerable amount of an amorphous polymer generally termed atactic polymer.

In the polymerization or copolymerization of α-olefin such as propylene, if such an amorphous polymer is contained in admixture with the stereospecific polymer product, it greatly impairs the mechanical and physical properties of the polymer product thus obtained. This necessitates an extraction process for the removal of the amorphous polymer, which is of a low economic value, from the polymer product. Such an additional process causes a great economic loss.

It is, therefore, advantageous for industrial purposes to develop a catalyst system that enables one to obtain α-olefin polymers by means of a high activity catalyst without lowering the yield rate of stereospecific polymer products, and a method for such polymerization.

SUMMARY OF THE INVENTION

The principal object of this invention is to provide a method for manufacturing a catalyst which makes possible the manufacture of an α-olefin polymer by means of high polymerization activity without lowering the yield rate of a crystalline polymer, and also to provide a method for the polymerization or copolymerization of α-olefin in the presence of the catalyst.

This invention is characterized in that the polymerization of a crystalline polymer is carried out with a high rate of yield by means of a high polymerization activity by bringing α-olefin into contact with a catalyst system comprising an organoaluminum compound and a reformed titanium trichloride. The reformed titanium trichloride is prepared by simultaneously pulverizing (hereinafter called "copulverization") and organoaluminum compound and a crystalline or solid solution titanium trichloride compound, the crystalline or solid solution compound comprising titanium trichloride and aluminum trichloride, treating the copulverized mixture with at least one solvent selected from (1) aromatic hydrocarbons, (2) aromatic hydrocarbon halides, and (3) organic ethers, separating the treated material from the solvent, and heating the separated material.

With the catalyst which is prepared in accordance with this invention employed in the polymerization or copolymerization of α-olefin, stereospecific polymer products can be manufactured by means of great polymerization activity at a high rate of yield.

For example, when a catalyst system of this invention comprising, a reformed titanium trichloride and a diethyl aluminum chloride is employed in carrying out the polymerization of propylene, the polymer yield per gram of the reformed titanium trichloride is several times as much as the yield attained with the catalyst comprising a commercially available titanium trichloride and a diethyl aluminum chloride.

DETAILED DESCRIPTION OF PREFERRED EMBODIMENTS

The titanium trichloride that can be employed as material for the preparation of the reformed titanium trichloride by which the catalyst system of this invention is characterized includes: A crystalline compound of titanium trichloride which comprises aluminum trichloride and titanium trichloride, which crystalline compound is prepared by reducing titanium tetrachloride in the presence of aluminum trichloride with metal aluminum, and which is expressed by the formula $3TiCl_3 \cdot AlCl_3$; and a titanium trichloride which contains an aluminum trichloride in the form of a solid solution, which solid solution is prepared by simultaneous pulverization carried out with various pulverizers of the aluminum trichloride added to titanium tichloride obtained by reducing titanium tetrachloride with hydrogen. In other words, the titanium trichloride used for the preparation of the reformed titanium trichloride may be selected from solid solution or crystalline compounds consisting of titanium trichloride and aluminum trichloride. Particularly, the crystalline titanium trichloride compound prepared by reducing titanium tetrachloride with metal aluminum in the presence of aluminum trichloride, which crystalline compound is expressed by the formula $3TiCl_3 \cdot AlCl_3$, or a material prepared by pulverizing this crystalline compound by means of various pulverizers, namely the crystalline titanium trichloride compound which is now widely in use as a component of a catalyst for the polymerization of $\alpha$-olefin such as propylene, is preferable as a material for the preparation of the reformed titanium trichloride.

The following discussion relating to the preparation of the reformed titanium trichloride is set forth with respect to the use of a crystalline titanium trichloride compound as a starting material. However, it is also permissible to use solid solution titanium trichloride compound as a starting material, as noted above.

The first step in the preparation of the reformed titanium trichloride is to obtain a co-pulverized mixture by co-pulverizing the crystalline titanium trichloride compound and an organoaluminum compound.

As for the organoaluminum compound to be co-pulverized with the crystalline titanium trichloride compound, the organoaluminum compound which is expressed by the formula $AlRnX_{3-n}$ ( $O < n \leqq 3$; R represents hydrocarbon radicals and X halogen), and which is widely known as a component of the Ziegler-Natta type catalyst generally used for the polymerization of $\alpha$-olefin such as propylene, can be employed. The use of organoaluminum compounds consisting of radicals having 1 to 8 carbon atoms is most advantageous.

Such organoaluminum compounds include triethyl aluminum, tri-n-propyl aluminum, tri-n-butyl aluminum, triisobutly aluminum, tri-2-methyl-pentyl aluminum, tri-n-octyl aluminum, deithyl aluminum chloride, diisobutyl aluminum chloride, methyl aluminum sesquichloride, ethyl aluminum sesquichloride, isobutyl aluminum dichloride, ethyl aluminum dichloride, etc.

The quantity of the organoaluminum compound which is to be co-pulverized with the crystalline titanium trichloride compound may be set at any value within the range from 0.1 to 25 parts of the organoaluminum compound to 100 parts of the crystalline titanium trichloride compound.

If the quantity of the organoaluminum compound is less than 0.1 part against 100 parts of the crystalline titanium trichloride compound, there will be no effect of co-pulverization. On the other hand, if it exceeds 25 parts against 100 parts of the crystalline titanium trichloride compound, the co-pulverized mixture tends to stick to inner walls of the pulverizer or to the grinding medium employed during the co-pulverizing process.

The addition of the organoaluminum compound to the crystalline titanium trichloride compound can be made at any point of time for co-pulverization. The co-pulverization may be carried out after adding an organoaluminum compound to a crystalline titanium trichloride compound which has not been pulverized or it may further be carried out after the addition of the organoaluminum compound to a crystalline titanium trichloride compound which has already been pulverized.

The time for co-pulverization varies with the type of the pulverizer employed, the co-pulverizing conditions and the degree of previous pulverization already exerted on the crystalline titanium trichloride compound. The co-pulverization of a crystalline titanium trichloride compound which has not been pulverized, with an organoaluminum compound usually takes a relatively long period of time. However, when a crystalline titanium trichloride compound has been sufficiently pulverized beforehand, the co-pulverization with an organoaluminum compound can be accomplished within a relatively short period of time.

The co-pulverization of a crystalline titanium trichloride compound with an organoaluminum compound can be accomplished with various kinds of pulverizers that are widely known such as vibration mills, ball mills, etc.

For the manufacture of the reformed titanium trichloride of this invention, the process of co-pulverizing a crystalline titanium trichloride compound and an organoaluminum compound is indispensable. The effect of the reformed titanium trichloride which characterizes this invention can not be attained by merely bringing the crystalline titanium trichloride compound into contact with the organoaluminum compound, even if the treatment is carried out thereafter with the above stated solvent and then the heating treatment is also carried out as described in the foregoing.

The present inventors conducted an experiment wherein a previously pulverized crystalline titanium trichloride compound and a diethyl aluminum chloride were brought into contact with each other in n-heptane; the thus processed material was treated with n-butyl ether and then subjected to a heating treatment; after this, a catalyst system was prepared using the heat treated material in combination with diethyl aluminum chloride; and polymerization was carried out by bringing propylene into contact with this catalyst system. Through this experiment, it was confirmed that this catalyst system did not have any advantageous effects on the polymerization of $\alpha$-olefin such as propylene, etc.

For polymerization or co-polymerization of $\alpha$-olefin, trials have hitherto been made for manufacturing crystalline polymer advantageously by bringing $\alpha$-olefin into contact with a catalyst system composed mainly of a reformed titanium trichloride, prepared by means of co-pulverization of a titanium trichloride with various organic and inorganic compounds, and an organoaluminum compound so as to achieve the foregoing object.

However, since the reformed titanium trichloride in the catalyst system contains inorganic and organic compounds, these inorganic and organic compounds must be separated from the solvent for polymerization in most cases.

It is another feature of this invention that, since the organoaluminum compound used for the co-pulverization with the crystalline titanium trichloride compound is also used as a component of the Ziegler-Natta type catalyst which is widely known as a catalyst for the polymerization of α-olefin such as propylene etc., the organoaluminum compound does not have to be separated from the polymerization system. This means that the conventional polymerization apparatuses can be utilized as they are in practicing the method of this invention for the polymerization of α-olefin such as propylene, etc.

The co-pulverized mixture comprising the crystalline titanium trichloride compound and the organoaluminum compound is treated with at least one solvent selected from the group consisting of (1) aromatic hydrocarbons (2) aromatic hydrocarbon halides, and (3) organic ethers.

The treatment with such solvents results in a great enhancement of the polymerization activity of the titanium trichloride.

The mechanism as to the enhancement of the polymerization activity of the treated titanium trichloride is unknown. It, however, seems that the crystal structure of the titanium trichloride is somehow changed, because the X-ray diffraction pattern of the treated titanium trichloride shows a peak around $2\theta = 32°$, which never appears in those of a commercially available ordinary crystalline titanium trichloride compound. It is presumed, therefore, that such a change in the crystal structure of the titanium trichloride causes the increased polymerization activity.

The aromatic hydrocarbon that can be employed in the treatment is selected from unsubstituted aromatic hydrocarbons or aromatic hydrocarbons substituted by hydrocarbon radicals, including: Benzene, toluene, xylene, ethylbenzene, propylbenzene, butylbenzene, pentylbenzene, ethyltoluene, etc.

The aromatic hydrocarbon halide usable for the treatment is selected from aromatic hydrocarbon halides having one or more hydrogen atoms of their aromatic nucleus replaced by one or more halogen atoms, such halides including: Chlorobenzene, dichlorobenzene, bromobenzene, dibromobenzene, fluorobenzene, fluorotoluene, chlorotoluene, bromotoluene and the like.

The organic ether compound usable for the treatment is selected from organic ether compounds having 4 to 12 carbon atoms. Such compounds include: Ethylether, propylether, butylether, n-amylether, isoamylether, hexylether, ethylpropylether, ethylisobutylether, ethylisopropylether, ethylisoamylether, ethylphenylether, ethylpropargylether, phenylether, ethyleneglycolmonomethylether, ethyleneglycoldimethylether, diethylene-glycoldiethylether, ethyleneglycolmonoethylether, ethylene-glycoldiethylether and the like.

With an organic ether compound employed as the treating solvent, it is usually more advantageous to dilute it, before use, with a solvent of aliphatic hydrocarbon such as n-heptane or n-hexane, or cyclic hydrocarbon such as cyclohexane.

For the treatment, a batch process can be employed and the treating solution can be separated from the treated titanium trichloride by either a filtration process or a decantation process. The treatment may be also carried out by using a Soxhlet's extractor.

In carrying out the treatment with a solvent, it is preferable to separate materials that are soluble in the treating solvent as much as possible from the titanium trichloride to be treated. With such materials incompletely separated from the titanium trichloride to be treated, the polymerization activity of the treated titanium trichloride does not increase. This is believed to be caused by the materials soluble in the treating solvent, as they cover the surface of the treated titanium trichloride.

There is no particular limitation on the temperature at which the treatment with the solvent is carried out. However, the preferable range of the treating temperature is generally from 0° C to the boiling point of the solvent employed or that of the aliphatic hydrocarbon employed as diluent, whichever is lower.

There is also no particular limit to the treatment time. It, however, usually suffices to continue treatment for a period of less than 40 hours. The continuation of treatment for a period more than 40 hours brings about no particular advantages.

The treated titanium trichloride which has been treated in the manner as described in the foregoing is subjected to a heating process carried out at 1 – 760 mmHg (absolute pressure) by means of a heating apparatus, which is equipped with stirring blades, to obtain the reformed titanium trichloride which is usable as a component of the polymerization catalyst of this invention and which possesses a high polymerization activity and an improved stereospecific property.

The stirring conditions vary with the type and the specification of the heating apparatus employed. There are no particular limitations to such conditions so long as a homogeneous temperature and sufficient surface renewal are ensured.

The heating treatment is carried out at a temperature between 50° and 200° C for a period of 0.5 to 5 hours. With the heating treatment temperature below 50° C, the treatment brings about no heating effects; and with the temperature above 200° C, the polymerization activity of the reformed titanium trichloride decreases.

For carrying out the method of the present invention, as for an organoaluminum compound to be employed in combination with the reformed titanium trichloride, an organoaluminum compound expressed by the following general formula can be employed: $AlRnX_{3-n}$, ( $O < n \leq 3$ ), wherein R indicates hydrocarbon radical and X represents a halogen.

The organoaluminum compounds as mentioned above include triethyl aluminum, diethyl aluminum chloride, ethyl aluminum dichloride, ethyl aluminum sesquichloride, triisobutyl aluminum and diisobutyl aluminum chloride and others.

The quantitative ratio of the reformed titanium trichloride to the organoaluminum compound can be selected from a wide range of ratios. Normally, however, a suitable Al/Ti molar ratio is between 1 : 1 and 20 : 1.

Furthermore, for carrying out the method of the present invention, a commonly used compound having the property of supplying electrons may be used in combination in the catalyst system of the present invention.

In practicing the method of this invention, the polymerization temperature is set between room temperature and 100° C. The polymerization solvent is selected from aromatic hydrocarbon such as benzene, toluene, xylene, etc.; aliphatic hydrocarbon such as heptane, hexane, octane, etc.; cyclic hydrocarbon such as cyclohexane; and liquefied propylene. In addition, a molecular weight adjusting agent such as hydrogen may also be employed.

The method of this invention is applicable to the polymerization or copolymerization of α-olefin hydrocarbon such as ethylene, propylene and butene-1.

To further illustrate this invention, but not by way of limitation, the following examples are given.

EXAMPLE 1

180 g of crystalline titanium trichloride compound, which has been prepared by reducing titanium tetrachloride with metal aluminum in the presence of aluminum trichloride and removing excess titanium tetrachloride by distillation, is put in a vibration mill having a volume of 1.3 liters in a nitrogen gas stream for pulverization, which is carried out for 40 hours at room temperature. Then, 14 g of diethyl aluminum chloride is added for co-pulverization, which is carried out for 10 hours to obtain a co-pulverized mixture comprising the crystalline titanium trichloride compound and the diethyl aluminum chloride.

A glass flask having a volume of 1000 ml is filled with 100 g of co-pulverized mixture and 400 ml of benzene. After stirring for two hours at room temperature, filtration is carried out in a nitrogen gas stream to obtain a treated titanium trichloride. The treated titanium trichloride is thoroughly washed with 1000 ml of benzene on a filter, separated from the solvent and then subjected to a drying process which is carried out for three hours at 25° C and a pressure of 100 mmHg (absolute pressure).

Then 50 g of the treated titanium trichloride is put in a 300 ml glass flask equipped with stirring blades for a heating treatment, which is carried out with stirring for two hours under atmospheric pressure and at 140° C to obtain a reformed titanium trichloride.

0.15 g of the reformed titanium trichloride and 0.6 g of diethyl aluminum chloride are put in a 2 liter stainless steel autoclave, equipped with an agitator, containing 1000 ml of n-heptane as polymerization solvent.

After adjusting the inside temperature of the autoclave to 70° C, 400 ml of hydrogen gas is put therein. Then, by introducing propylene gas into the autoclave, the inside pressure is set at 6 kg/cm²G. The polymerization is considered to have begun when the propylene gas has been introduced.

During the polymerization reaction, the inside temperature of the autoclave is kept at 70° C and the inside pressure at 6 kg/cm²G. After six hours from the beginning of the polymerization, the supply of the propylene gas is stopped and the propylene gas inside the autoclave is exhausted from the system.

The polymerization product is separated by filtration after the residual catalyst was decomposed by a methyl alcohol-isopropyl alcohol mixture. The product is subjected to vacuum drying to obtain 348 g of a polymer. On the other hand, the filtrate is subjected to an evaporation drying process to recover an oily product and an atactic polymer of low molecular weight contained in the polymerization solvent.

The polymerization product is treated with boiling n-heptane for 24 hours to extract the atactic polymer.

As a result of the above process, polymerization activity 2320 and I.Y. 91.6% are obtained, the polymerization activity and the I.Y. being defined as follows:

Polymerization activity: The weight of the polymer product per gram of the reformed titanium trichloride or the crystalline titanium trichloride compound (g/g)

$$I.Y.: \frac{\text{Weight of polymer insoluble in n-heptane}}{\text{Weight of total polymer product}} \times 100\ (\%)$$

The above definition also applies to the following examples and comparative examples.

EXAMPLE 2

The copolymerization of propylene and ethylene is carried out using the reformed titanium trichloride prepared under the same conditions as in Example 1. 0.2 g of the reformed titanium trichloride and 0.4 g of diethyl aluminum chloride are put in a 2 liter stainless steel autoclave, equipped with an agitator, containing 1000 ml of n-heptane as polymerization solvent.

After the inside temperature of the autoclave is adjusted to 70° C, a gas mixture of propylene and ethylene (containing 5 molar % ethylene) is introduced into the autoclave and the inside pressure is kept at 3.0 kg/cm²G.

The copolymerization is considered to have begun when the gas mixture has been introduced. The inside of the autoclave is continuously agitated and the temperature is kept at 70° C during the copolymerization.

When 3.5 hours has elapsed after the start of the copolymerization, the supply of the gas mixture is stopped and the gas mixture inside the autoclave is exhausted from the system. The residual catalyst is decomposed with a methyl alcohol-isopropyl alcohol mixture; and the copolymerization product is separated by filtration and dried to obtain 247 g of the copolymer product.

On the other hand, the filtrate is subjected to evaporation drying to recover an oily product and an atactic polymer of low molecular weight contained therein. Then, extraction is carried out by treating the copolymerization product with boiling n-heptane for 10 hours.

Through the above processes, polymerization activity 1235 and I.Y. 74.1 are obtained.

EXAMPLES 3 – 7

Reformed titanium trichloride is prepared under the same conditions as in Example 1 except that different compounds are employed as the organoaluminum compound to be co-pulverized with the crystalline titanium trichloride compound. Then, using the reformed titanium trichloride and diethyl aluminum chloride, the polymerization of the propylene is carried out under the same conditions as in Example 1.

Table 1 shows the organoaluminum compounds used for co-pulverization with the crystalline titanium trichloride compound and the results of polymerization tests.

Table 1

| Example No. | Organoaluminum compounds | Polymerization test results | |
|---|---|---|---|
| | | Polymerization activity | I.Y. |
| 3 | Triethyl aluminum | 2218 | 90.7 |
| 4 | Triisobutyl aluminum | 1907 | 91.0 |
| 5 | Ethyl aluminum sesquichloride | 2094 | 91.1 |
| 6 | Ethyl aluminum dichloride | 2073 | 91.5 |
| 7 | Isobutyl aluminum dichloride | 2114 | 90.4 |

EXAMPLES 8 – 14

Reformed titanium trichloride is prepared under the same conditions as in Example 1 except that the diethyl aluminum chloride to be co-pulverized with the crystalline titanium trichloride compound is used in different quantities. Then, using the reformed titanium trichloride thus prepared and diethyl aluminum chloride, the polymerization of propylene is carried out under the same conditions as in Example 1.

The addition quantities of the diethyl aluminum chloride which is co-pulverized with the crystalline titanium trichloride compound and the results of polymerization tests conducted are as shown in Table 2.

Table 2

| Example No. | Addition quantity of diethyl aluminum chloride (g) | Polymerization test results | |
|---|---|---|---|
| | | Polymerization activity | I.Y. |
| 8 | 0.9 | 1393 | 90.9 |
| 9 | 1.8 | 1411 | 91.0 |
| 10 | 5.4 | 1507 | 91.3 |
| 11 | 9.0 | 1913 | 92.0 |
| 12 | 18.0 | 2517 | 90.3 |
| 13 | 27.0 | 2600 | 89.1 |
| 14 | 36.0 | 1519 | 90.1 |

EXAMPLES 15 – 21

Reformed titanium trichloride is prepared under the same conditions as in Example 1 except that different solvents are used for the treatment of the copulverized mixture of the crystalline titanium trichloride compound and the diethyl aluminum chloride. Using the reformed titanium trichloride thus prepared, and diethyl aluminum chloride, the polymerization of propylene is carried out under the same conditions as in Example 1.

The treating solvents employed and the results of polymerization tests are as shown in Table 3.

Table 3

| Example No. | Treating solvents | Polymerization test results | |
|---|---|---|---|
| | | Polymerization activity | I.Y. |
| 15 | Toluene | 2140 | 91.9 |
| 16 | Xylene | 1843 | 90.7 |
| 17 | Chlorobenzene | 2314 | 91.6 |
| 18 | Dichlorobenzene | 2075 | 90.1 |
| 19 | Ethylbenzene | 2200 | 91.8 |
| 20 | Propylbenzene | 1994 | 91.3 |
| 21 | Bromobenzene | 2170 | 90.2 |

EXAMPLE 22

154 g of a commercially available, hydrogen reduced titanium trichloride (TiCl$_3$H manufactured by Stauffer Chemical Co. of U.S.A.) and 44 g of aluminum trichloride are put in a vibration mill having a volume of 1.3 liters and are pulverized for 40 hours at room temperature to obtain a pulverized titanium trichloride containing aluminum trichloride in the form of solid solution. Then a reformed titanium trichloride is prepared under the same conditions as in Example 1 using the above stated titanium trichloride. Following this, the polymerization of propylene is carried out under the same conditions as in Example 1 to obtain polymerization activity 2273 and I.Y. 90.8.

EXAMPLE 23

100 g of the co-pulverized mixture comprising the crystalline titanium trichloride compound and the diethyl aluminum chloride prepared under the same conditions as in Example 1 is put in a 500 ml glass flask equipped with stirring blades and containing 20 ml of n-butylether and 180 ml of n-heptane. After stirring at room temperature for two hours, filtration is immediately carried out in a nitrogen gas stream, and then washing is thoroughly carried out with 1000 ml of n-heptane on a filter to obtain a treated titanium trichloride. The treated titanium trichloride is dried at 25° C and under 100 mmHg (absolute pressure). 50 g of this treated titanium trichloride is placed in a 300 ml glass flask equipped with stirring blades and the heating treatment is carried out with stirring under atmospheric pressure at 80° C for three hours to obtain a reformed titanium trichloride.

The polymerization of propylene is carried out using this reformed titanium trichloride and diethyl aluminum chloride under the same conditions as in Example 1 to obtain polymerization activity 2657 and I.Y. 95.5.

EXAMPLE 24

The copolymerization of propylene and ethylene is carried out under the same conditions as in Example 2 with the reformed titanium trichloride prepared under the same conditions as in Example 2 and diethyl aluminum chloride. Through this co-polymerization, polymerization activity 1320 and I.Y. 75.3 are obtained.

EXAMPLES 25 – 29

Reformed titanium trichloride is prepared under the same conditions as in Example 23 except that different organoaluminum compounds are employed for the co-pulverization with the crystalline titanium trichloride compound. Using the reformed titanium trichloride thus prepared, and diethyl aluminum chloride, the polymerization of propylene is carried out under the same conditions as in Example 1.

The organoaluminum compounds employed in the co-pulverization and the results of the polymerization tests are as shown in Table 4.

Table 4

| Example No. | Organoaluminum compounds | Polymerization test results | |
|---|---|---|---|
| | | Polymerization activity | I.Y. |
| 25 | Triethyl aluminum | 2259 | 91.9 |
| 26 | Triisobutyl aluminum | 2318 | 92.5 |
| 27 | Ethyl aluminum sesquichloride | 2407 | 93.0 |
| 28 | Tri-n-propyl aluminum | 2615 | 93.9 |
| 29 | Diisobutyl aluminum chloride | 2464 | 94.5 |

EXAMPLES 30 – 38

Reformed titanium trichloride is prepared under the same conditions as in Example 23 except that different organic ether compounds are employed for the treatment of the co-pulverized mixture of the crystalline titanium trichloride compound and the diethyl aluminum chloride. With the reformed titanium trichloride prepared as described above, and diethyl aluminum chloride, the polymerization of propylene is carried out under the same conditions as in Example 1.

The organic ether compounds employed in the treatment and the results of the polymerization tests are as shown in Table 5.

Table 5

| Example No. | Organic ether compounds | Polymerization test results | |
|---|---|---|---|
| | | Polymerization activity | I.Y. |
| 30 | Propylether | 2436 | 94.5 |
| 31 | n-amylether | 2575 | 94.7 |
| 32 | Isoamylether | 2631 | 95.0 |
| 33 | Hexylether | 2503 | 94.5 |
| 34 | Ethylisobutylether | 2600 | 94.3 |
| 35 | Ethylisoamylether | 2619 | 93.9 |
| 36 | Ethyleneglycoldimethylether | 2433 | 93.5 |
| 37 | Ethyleneglycoldiethylether | 2476 | 94.0 |
| 38 | Diethyleneglycoldiethylether | 2492 | 94.6 |

EXAMPLE 39

A co-pulverized mixture comprising hydrogen reduced titanium trichloride, aluminum trichloride and diethyl aluminum chloride is prepared under the same conditions as in Example 22. Using this co-pulverized mixture, a reformed titanium trichloride is prepared under the same conditions as in Example 23 and the polymerization of propylene is carried out under the same conditions as in Example 1 to obtain polymerization activity 2513 and I.Y. 94.1.

COMPARATIVE EXAMPLE 1

A crystalline titanium trichloride compound which is prepared by reducing titanium tetrachloride under the same conditions as in Example 1 is pulverized for 40 hours in the same manner as described in Example 1. Using this, pulverized crystalline titanium trichloride compound and diethyl aluminum chloride, the polymerization of propylene is carried out under the same conditions as in Example 1 to obtain polymerization activity 997 and I.Y. 87.9.

COMPARATIVE EXAMPLE 2

Using the pulverized crystalline titanium trichloride compound prepared under the same conditions as in Comparative Example 1, and diethyl aluminum chloride, the co-polymerization of propylene and ethylene is carried out under the same conditions as in Example 2 to obtain polymerization activity 736 and I.Y. 71.6

COMPARATIVE EXAMPLE 3

Using the pulverized mixture comprising hydrogen reduced titanium trichloride and aluminum trichloride prepared under the same conditions as in Example 22, and diethyl aluminum chloride, the polymerization of propylene is carried out under the same conditions as in Example 1 to obtain polymerization activity 963 and I.Y. 86.4.

COMPARATIVE EXAMPLE 4

The treated titanium trichloride is prepared by treating, with n-butylether, a co-pulverized mixture of crystalline titanium trichloride compound and diethyl aluminum chloride under the same conditions as in Example 23.

Using this treated titanium trichloride which has not undergone the heating treatment and diethyl aluminum chloride, the polymerization of propylene is carried out under the same conditions as in Example 1 to obtain polymerization activity 2148 and I.Y. 84.4.

COMPARATIVE EXAMPLE 5

The glass flask equipped with stirring blades and containing 7 g of diethyl aluminum chloride and 500 ml of n-heptane is filled with 100 g of a pulverized crystalline titanium trichloride compound prepared under the same conditions as in Example 1. After stirring for two hours at 50° C, filtration is immediately carried out in a nitrogen gas stream. After washing with 1000 ml of n-heptane on a filter, a drying process is carried out at 25° C and a pressure of 100 mmHg (absolute pressure). The material obtained through this process is treated with n-butylether in the same manner as in Example 23 and is then subjected to the heating treatment. Using the thus obtained titanium trichloride and diethyl aluminum chloride, the polymerization of propylene is carried out under the same conditions as in Example 1 to obtain polymerization activity 1317 and I.Y. 87.1.

COMPARATIVE EXAMPLE 6

Using the co-pulverized mixture comprising the crystalline titanium trichloride compound and the diethyl aluminum chloride prepared under the same conditions as in Example 1, and diethyl aluminum chloride, the polymerization of propylene is carried out under the same conditions as in Example 1 to obtain polymerization activity 1108 and I.Y. 85.2.

COMPARATIVE EXAMPLE 7

The pulverized crystalline titanium trichloride compound prepared under the same conditions as in Comparative Example 1, is treated by benzene and dried at 25° C under the same conditions as in Example 1.

Using thus obtained titanium trichloride, and diethyl aluminum chloride, the polymerization of propylene is carried out under the same conditions as in Example 1 to obtain polymerization activity 1374 and I.Y. 87.4.

COMPARATIVE EXAMPLE 8

The pulverized crystalline titanium trichloride compound prepared under the same conditions as in Comparative Example 1, is subjected to a heating treatment at 140° C under the same conditions as in Example 1.

Using thus obtained titanium trichloride, and diethyl aluminum chloride, the polymerization of propylene is carried out under the same conditions as in Example 1 to obtain polymerization activity 756 and I.Y. 90.3.

COMPARATIVE EXAMPLE 9

The treated titanium trichloride is prepared by treating, with benzene, a co-pulverized mixture of crystalline titanium trichloride compound and diethyl aluminum chloride under the same conditions as in Example 1.

Using thus treated titanium trichloride which has not undergone the heating treatment, and diethyl aluminum chloride, the polymerization of propylene is carried out under the same conditions as in Example 1 to obtain polymerization activity 2272 and I.Y. 82.9.

COMPARATIVE EXAMPLE 10

The pulverized crystalline titanium trichloride compound prepared under the same conditions as in Comparative Example 1, is treated by benzene, dried at 25° C and subjected to a heating treatment at 140° C under the same conditions as in Example 1.

Using thus obtained titanium trichloride, and diethyl aluminum chloride, the polymerization of propylene is carried out under the same conditions as in Example 1 to obtain polymerization activity 1155 and I.Y. 90.2.

COMPARATIVE EXAMPLE 11

The pulverized crystalline titanium trichloride compound prepared under the same conditions as in Comparative Example 1, is treated by benzene, dried at 25° C, subjected to a heating treatment at 140° C under the same conditions as in Example 1 and then co-pulverized with diethyl aluminum chloride under the same conditions as in Example 1.

Using thus obtained titanium trichloride, and diethyl aluminum chloride, the polymerization of propylene is carried out under the same conditions as in Example 1, to obtain polymerization activity 1417 and I.Y. 88.2.

EXAMPLE 40

Using the reformed titanium trichloride prepared under the same conditions as in Example 1, the polymerization of butene-1 is carried out.

For this purpose, 0.5 g of the reformed titanium trichloride and 1 g of diethyl aluminum chloride are placed in a 2 liter stainless steel autoclave equipped with stirring blades and containing 700 ml of n-heptane. Following this, 500 ml of butene-1 is added and the inside temperature of the autoclave is raised to 70° C. The polymerization is considered to have begun when butene-1 has been poured into the autoclave. The inside temperature of the autoclave is kept at 70° C throughout the polymerization reaction period.

Four hours after the start of the polymerization, the butene-1 gas inside the autoclave is exhausted from the system. The residual catalyst is decomposed by means of a methyl alcohol-isopropyl alcohol mixture and the polymerized product is separated by filtration and dried to obtain 89 g of a polymer product.

On the other hand, an oily product and an atactic polymer of lower molecular weight contained in the polymerization solvent are recovered by subjecting the filtrate to an evaporation drying process. The polymerization product is treated with boiling ethyl ether for 24 hours to extract an atactic polymer.

Through the above process, polymerization activity 178 and I.Y. 94.3 are obtained. While the definition of the polymerization activity given in Example 1 applies to this example, the I.Y. in this example is defined as shown below:

$$I.Y.: \frac{\text{Weight of polymer insoluble in ethyl ether}}{\text{Weight of total polymer product}} \times 100(\%)$$

EXAMPLE 41

Using the reformed titanium trichloride prepared under the same conditions as in Example 23, and diethyl aluminum chloride, the polymerization of butene-1 is carried out under the same conditions as in Example 40 to obtain polymerization activity 185 and I.Y. 94.7.

COMPARATIVE EXAMPLE 12

Using the pulverized crystalline titanium trichloride compound prepared under the same conditions as in Comparative Example 1, and diethyl aluminum chloride, the polymerization of butene-1 is carried out under the same conditions as in Example 40 to obtain polymerization activity 107 and I.Y. 87.1.

What is claimed is:

1. A method which comprises polymerizing or copolymerizing α-olefins in the presence of a catalyst system comprising the following components A and B:
    component A: reformed titanium trichloride prepared by co-pulverizing a mixture consisting of (1) an organoaluminum compound of the formula $AlRnX_{3-n}$, wherein R represents a hydrocarbon radical of 1 - 8 carbon atoms, $n$ is equal to or less than three but greater than zero, and X represents halogen, and (2) a crystalline or solid solution titanium trichloride compound consisting essentially of titanium trichloride and aluminum trichloride, the weight ratio of the organoaluminum compound to the crystalline or solid solution titanium trichloride compound being from 0.1 : 100 to 25 : 100, treating the resultant co-pulverized mixture with at least one solvent selected from the group consisting of aromatic hydrocarbons, aromatic hydrocarbon halides and organic ethers, separating the treated material from the solvent, and heating the separated material at a temperature of from 50° to 200° C for from 0.5 to 5 hours;
    component B: an organoaluminum compound.

2. The method as defined in claim 1, employing a crystalline titanium trichloride compound which is obtained by reducing titanium tetrachloride with metal aluminum in the presence of aluminum trichloride.

3. The method as defined in claim 1, employing a solid solution titanium trichloride compound which is obtained by reducing titanium tetrachloride with hydrogen to obtain titanium trichloride, admixing the titanium trichloride with aluminum trichloride, and pulverizing the resultant mixture.

4. The method as defined in claim 1, wherein said organoaluminum compound used in preparing component A is at least one member selected from the group consisting of triethyl aluminum, tri-n-propyl aluminum, tri-n-butyl aluminum, triisobutyl aluminum, tri-2-methyl-pentyl aluminum, tri-n-octyl aluminum, diethyl aluminum chloride, diisobutyl aluminum chloride, methyl aluminum sesquichloride, ethyl aluminum sesquichloride, isobutyl aluminum dichloride and ethyl aluminum dichloride.

5. The method as defined in claim 1, wherein the aromatic nucleus of said aromatic hydrocarbons is unsubstituted or substituted by a hydrocarbon radical.

6. The method as defined in claim 1, wherein said aromatic hydrocarbon is at least one member selected from the group consisting of benzene, toluene, xylene, ethylbenzene, propylbenzene, butylbenzene, pentylbenzene, ethyltoluene and butyltoluene.

7. The method as defined in claim 1, wherein said aromatic hydrocarbon halides contain more than one halogen atom.

8. The method as defined in claim 1, wherein said aromatic hydrocarbon halide is at least one member selected from the group consisting of chlorobenzene, dichlorobenzene, bromobenzene, dibromobenzene, fluorobenzene, chlorotoluene, bromotoluene and fluorotoluene.

9. The method as defined in claim 1, wherein said organic ether contains 4 to 12 carbon atoms.

10. The method as defined in claim 1, wherein said organic ether is at least one member selected from the group consisting of ethylether, propylether, butylether, n-amylether, isoamylether, hexylether, ethylpropyl ether, ethyl isobutylether, ethylisopropylether, ethylisoamylether, ethylphenylether, ethylpropargyether, phenylether, ethyleneglycolmonomethylether, ethyleneglycoldimethylether, diethyleneglycoldiethylether, ethyleneglycolmonoethylether and ethyleneglycoldiethylether.

11. The method as defined in claim 1, wherein said heating treatment for obtaining said reformed titanium trichloride is carried out at a pressure between 1 and 760 mmHg.

12. The method as defined in claim 1, wherein said organoaluminum compound used as said component B is at least one member selected from the group consisting of triethyl aluminum, diethyl aluminum chloride, ethyl aluminum dichloride, ethyl aluminum sesquichloride, triisobutyl aluminum and diisobutyl aluminum chloride.

13. A method for manufacturing a component of a catalyst for the polymerization of α-olefins which comprises co-pulverizing a mixture consisting of (1) an organoaluminum compound of the formula $AlRnX_{3-n}$, wherein R represents a hydrocarbon radical of 1 − 8 carbon atoms, $n$ is equal to or less than three but greater than zero, and X represents halogen, and (2) a crystalline or solid solution titanium trichloride compound comprising titanium trichloride and aluminum trichloride, the weight ratio of the organoaluminum compound to the crystalline or solid solution titanium trichloride compound being from 0.1 : 100 to 25 : 100, treating the resultant co-pulverized mixture with at least one solvent selected from the group consisting of aromatic hydrocarbons and aromatic hydrocarbon halides, separating the treated material from the solvent and heating the separated material at a temperature of from 50° to 200° C for from 0.5 to 5 hours to obtain a reformed titanium trichloride.

14. A method for manufacturing a component of a catalyst for the polymerization of α-olefins which comprises co-pulverizing a mixture consisting of (1) an organoaluminum compound of the formula $AlRnX_{3-n}$, wherein R represents a hydrocarbon radical of 1 − 8 carbon atoms, $n$ is equal to or less than three but greater than zero, and X represents halogen, and (2) a crystalline or solid solution titanium trichloride compound comprising titanium trichloride and aluminum trichloride, the weight ratio of the organoaluminum compound to the crystalline or solid solution titanium trichloride compound being from 0.1 : 100 to 25 : 100, treating the resultant co-pulverized mixture with an organic ether solvent, separating the treated material from the solvent and heating the separated material at a temperature of from 50° to 200° C for from 0.5 to 5 hours to obtain a reformed titanium trichloride.

15. The method as defined in claim 1, wherein the treatment of the co-pulverized mixture with the solvent is carried out by treating the co-pulverized mixture with a solvent system consisting of at least one solvent selected from the group consisting of aromatic hydrocarbons and aromatic hydrocarbon halides.

16. The method as defined in claim 13, wherein the treatment of the co-pulverized mixture with the solvent is carried out by treating the co-pulverized mixture with a solvent system consisting of at least one solvent selected from the group consisting of aromatic hydrocarbons and aromatic hydrocarbon halides.

17. The method as defined in claim 14, wherein the treatment of the co-pulverized mixture with the solvent is carried out by treating the co-pulverized mixture with a solvent consisting of an organic ether.

* * * * *